(12) United States Patent
Schienemann et al.

(10) Patent No.: US 8,261,815 B2
(45) Date of Patent: Sep. 11, 2012

(54) HEAT EXCHANGER, IN PARTICULAR CHARGE AIR COOLER OR EXHAUST GAS COOLER FOR AN INTERNAL COMBUSTION ENGINE OF A MOTOR VEHICLE AND METHOD FOR MANUFACTURING IT

(75) Inventors: Mark Schienemann, Stuttgart (DE); Florian Moldovan, Stuttgart (DE)

(73) Assignee: Behr GmbH & Co. KG, Stuttgart (DE)

( * ) Notice: Subject to any disclaimer, the term of this patent is extended or adjusted under 35 U.S.C. 154(b) by 930 days.

(21) Appl. No.: 12/126,299

(22) Filed: May 23, 2008

(65) Prior Publication Data

US 2008/0289833 A1 Nov. 27, 2008

(30) Foreign Application Priority Data

May 24, 2007 (DE) .......................... 10 2007 024 630

(51) Int. Cl.
*F28F 9/02* (2006.01)
*F01N 5/02* (2006.01)

(52) U.S. Cl. ........................... 165/158; 165/173; 165/51

(58) Field of Classification Search .................. 165/158, 165/173, 51
See application file for complete search history.

(56) References Cited

U.S. PATENT DOCUMENTS

| 4,485,867 A | * | 12/1984 | Melnyk et al. ................. 165/173 |
| 6,595,274 B2 | | 7/2003 | Hayashi et al. |
| 6,644,385 B2 | * | 11/2003 | Boissele et al. .................. 165/79 |

FOREIGN PATENT DOCUMENTS

| DE | 102 33 407 A1 | 2/2003 |
| DE | 10 2006 043 526 A1 | 4/2007 |
| DE | 102006043526 A1 * | 4/2007 |

* cited by examiner

*Primary Examiner* — Ljiljana Ciric
*Assistant Examiner* — Ignacio E Landeros
(74) *Attorney, Agent, or Firm* — Foley & Lardner LLP

(57) ABSTRACT

The invention relates to a heat exchanger, in particular a charge air cooler or exhaust gas cooler for an internal combustion engine of a motor vehicle, having a first box (2), a second box (3) which is arranged spaced apart from this first box (2), and a plurality of pipes (12) by means of which the first box (2) and the second box (3) are fluidically connected. Furthermore, the heat exchanger has a chamber (6) through which a coolant can flow and which is arranged between the two boxes (2, 3) and through which a plurality or all of these pipes (12), by means of which the two boxes (2, 3) are fluidically connected, run. The base (10, 11) is provided with one or more through-openings (16) for receiving the pipes (12), and at least one base (10, 11) has a border (7) which points away from the pipes toward the outside and is provided with a first step (20) and a second step (21), wherein the border (7) is arranged essentially in the edge region of the base (10, 11), and the second step (22) is arranged in the region of the first step (20), radially offset from the first step (20).

15 Claims, 5 Drawing Sheets

HEAT EXCHANGER, IN PARTICULAR CHARGE AIR COOLER OR EXHAUST GAS COOLER FOR AN INTERNAL COMBUSTION ENGINE OF A MOTOR VEHICLE AND METHOD FOR MANUFACTURING IT

CROSS-REFERENCE TO RELATED PATENT APPLICATIONS

The right of foreign priority is claimed under 35 U.S.C. §119(a) based on Federal Republic of Germany Application No. 10 2007 024 630.9, filed May 24, 2007, the entire contents of which, including the specification, drawings, claims and abstract, are incorporated herein by reference.

BACKGROUND OF THE INVENTION

The invention relates to a heat exchanger, in particular charge air cooler or exhaust gas cooler for an internal combustion engine of a motor vehicle and method for manufacturing it.

Heat exchangers which are embodied as what are referred to as all-aluminum heat exchangers are already known. It is also known that such heat exchangers or all aluminum heat exchangers can be used as charge air coolers for an internal combustion engine. Known charge air coolers have two boxes which are spaced apart and are fluidically connected by means of a large number of pipes, such as flat pipes. The charge air to be cooled then flows from one of the two boxes through the pipes into the other of the two boxes. Intermediate spaces through which a coolant can flow are provided between the pipes, transversely with respect to the direction of their longitudinal extent. The pipe block which is formed by these pipes is surrounded here by a separate piece of sheet metal which is closed circumferentially around the pipe block and forms a cover or casing so that a chamber is formed between the two boxes through which chamber the pipes run. This casing is provided with an inflow and outflow for coolant.

In such configurations it is known that charge air coolers which are configured as all-aluminum heat exchangers each have a box and a base on one side of the pipe block. The box forms here a type of hood which is closed on its open side by the base. A plurality of through-openings into which the pipes are inserted are provided here in the base. The base/bases are therefore also referred to as pipe plate/plates. The pipes are generally inserted into these bases before the respective bases are joined to the boxes which are respectively assigned to them. In configurations of this type, on the one hand the pipes are connected to the bases and, on the other hand the bases are connected to the boxes using suitable connecting means. It is known, for example, for the pipes to be soldered to the bases and for the bases to be soldered to the boxes.

In the prior art, DE 10 2006 043 526 A1 discloses a heat exchanger which has a pipe block and a base at the respective ends of the pipe block and a box which is fitted onto the respective base, wherein the bases and the boxes are soldered to one another. It is also known for the bases to be able to run in or over the box. For this purpose, the bases have, for example, a circumferential edge which projects in the longitudinal direction of the longitudinal axes of the pipes and which engages from the outside around the box end facing the base or is plugged into the box in the region of this box end. In this context, this projecting edge of the base is soldered to the box.

Further embodiments of such boxes in which a separate base is not provided and which have merely one box are also known. In such embodiments, the pipes are widened in their end regions facing the respective box and are soldered to one another in the widened regions.

SUMMARY OF PREFERRED EMBODIMENTS

The invention is based on the object of providing a heat exchanger, such as a charge air cooler or exhaust gas cooler, configured in particular as an all-aluminum heat exchanger, for an internal combustion engine of a motor vehicle, and of, in particular, further improving the connection between the base and box and between the base and cover. Furthermore, an object of the invention is to make available a method for manufacturing a heat exchanger according to the invention.

This object is achieved according to the invention by means of the heat exchanger as per claim 1. The corresponding method for manufacturing a heat exchanger according to the invention is presented by claim 13. Preferred developments are the subject matter of the subclaims.

A heat exchanger according to the invention has a first box and a second box which is arranged spaced apart from the latter and is fluidically connected to the second box via a plurality of pipes. The heat exchanger also has a chamber through which a coolant can flow and which is arranged between the two boxes and through which a plurality of these pipes, or all of these pipes run. Each box is closed off by a base which is provided with one or more through-openings for receiving the pipes. At least one base has a border which points away from the pipes toward the outside and is provided with a first step and a second step. The border is essentially arranged in the edge region of the base, and the second step is arranged in the region of the first step, offset toward the outside from the first step.

As a result of the application of heat when the box is welded, leaks may occur in nearby soldered connections. If the base is then provided on the side facing the box with two steps and on the side opposite the box with a base cutout according to the invention, the distance between the welding point on the box and the closest soldering point, in particular the soldering point in the region of the cover, is made larger. As a result of this, the temperature at the closest soldering point then no longer reaches the melting temperature of the solder. If the welding seam which has to be formed by welding a base to a box is placed at a sufficient distance as far as the coolant connectors, it is advantageous to embody the base with two steps according to the first embodiment of the base. In this context, there is no need for a base protrusion before the welding process, and less material is therefore required to manufacture the base.

In this preferred embodiment, the pipes are inserted with one of their respective ends into the through-openings of the first base and with their respective other end into the through-openings of the second base. There is provision for one of the boxes or both boxes to be each configured in such a way that the base of this box or the respective base of the respective box has a base groove which secures the cover when bundling the pipes, and has the second step, or a groove in the case of the second embodiment of the base, which secures the box and has the minimum distance of 7-10 mm, required for soldering, between the welding seam and the next soldered connection (cover/base or pipe/base).

The cover may be embodied, for example, in such a way that it bounds the chamber on one side but it may also be such that it forms, essentially circumferentially, an essentially closed sleeve for bounding the chamber, or is configured in some other way. It is also possible to provide for it to be configured in a plurality of parts or for a plurality of covers or covering plates to be provided which extend in the abovementioned way, in particular with an edge region, into a (respective) groove or respective grooves which are provided in the base of the first box and/or in the base of the second box. It is possible, for example, for in each case such a cover or such a covering plate to be provided on two opposite sides of the pipe block formed by the pipes.

According to one particularly preferred development, the chamber which is provided between the boxes is bounded by the boxes on the sides lying opposite in the direction of the longitudinal extent of the pipes. In one advantageous embodiment this is such that the chamber is bounded by the base of the first box on one of the two sides lying opposite the direction of the longitudinal extent of the pipes, and by the base of the second box on the other of these two sides lying opposite in the direction of the longitudinal extent of the pipes.

A heat exchanger according to the invention is configured in such a way that the pipe bundle (pipes, internal ribs, turbulence inlays, covers, bases) is soldered and then the cast boxes, preferably made of cast aluminum, are welded in a fluid-tight fashion onto the soldered block.

The base of the first box and/or the base of the second box have, on the side facing the box, at least one circumferential step and a second circumferential step or a circumferential groove for securing the box.

As is also shown by the statements above, the embodiments of the box and/or of the base and the interaction of the box and base or the interaction of the base and cover can refer to one of the two boxes or to both boxes.

According to one particularly preferred development of the invention there is provision that a first profiling elevation is spaced apart transversely, in particular perpendicularly, with respect to the direction of the longitudinal extent of the pipes, from the pipe block formed by the pipes, in particular flat pipes, in such a way that a first intermediate space is formed between this pipe block and this first profiling elevation transversely, in particular perpendicularly, with respect to the direction of the longitudinal extent of the pipes, wherein at least one cover, in particular covering plate, is provided for bounding the chamber, and wherein an, in particular end-side, wall section or edge of this cover extends into this first intermediate space. In this context it is possible to provide that this wall section of the cover which extends into the first intermediate space formed between the pipe block and the first profiling elevation bears essentially against this pipe block and/or against this first profiling elevation and/or is soldered to pipes of the pipe block and/or to the first profiling elevation, for example by means of solder plating.

One preferred configuration according to which, as previously mentioned, a wall section of the cover extends into a base groove of this base of the aforesaid type is particularly advantageous.

In one preferred embodiment of the heat exchanger, it is particularly advantageous for a second embodiment of the base if at least one base has, on the side facing the box, a third step with an upper edge, wherein the upper edge lies in a plane with the second step. The second step forms a groove between the first step and the third step. If the coolant connector is arranged too close to the base, in particular if the distance between the welding seam for the box and the coolant connector is <10 mm and therefore impedes the welding process, the second embodiment of the base which has a third step on the side of the base facing the box can advantageously be used. The box then extends into the abovementioned groove. This groove is advantageously a circumferential groove or an essentially circumferential groove. Furthermore, in the outer edge region of this second embodiment of the base, a base protrusion is formed. The protrusion of at least one base is preferably between 3 mm and 10 mm, preferably 5 mm. To join one of these bases and at least one box, a materially-connecting joining method, in particular welding, is preferably used, as a result of which the base decreases in its extent toward the outside in the region of the base protrusion, and welds the heat exchanger in particular in a fluid-tight fashion. The welding can be carried out, for example, by means of laser welding, WIG and MIG welding or in some other way. The base protrusion is eroded by the welding process so that after the welding only a small or even no base protrusion is present.

In a heat exchanger according to the invention, at least one box, or a wall section of the same box, advantageously extends into the second step of this base.

In a heat exchanger according to the invention, a base cutout which preferably extends from the first profiling elevation of the base to the inside of the base is preferably embodied on a side of at least one base which faces away from the box. The base cutout preferably forming a gap between the cover and the first profiling elevation.

There is provision that in a heat exchanger according to the invention, at least one box is preferably manufactured using a casting method, in particular the die-casting method. The cast box has, on standard bases, a wall thickness of $\geq 3$ mm. Cast boxes also have the advantage that holders which are possibly present can be directly cast at the same time (box and holder which is composed of one component).

In addition, it is preferred for the at least one cover, in particular covering plate, to be soldered to the base. In one advantageous configuration there is provision that the solder by means of which the base and the cover are soldered is provided in the region of the intermediate space formed between the profiling elevation and the base cutout.

The cover is advantageously soldered to the first profiling elevation and/or to the pipe sections thereof of pipes of the pipe block in the region of the intermediate space which is embodied between said first profiling elevation of the base and the cover, or in the region of the base groove in an alternative embodiment, with the result that solder is supplied to this base groove. The soldering is carried out by means of solder plating in one advantageous development.

According to one advantageous development, the base is of essentially flat or planar design.

The at least one cover can be formed from sheet metal. The base or the bases is/are advantageously embodied in one piece or fabricated from a one-piece part.

There is in particular provision that the pipes, or all the pipes, are spaced apart in the direction viewed transversely with respect to the direction of the longitudinal extent, so that pipe intermediate spaces for a through-flow of a medium (in particular coolant) which is different from the medium flowing through the pipe (in particular exhaust gas or charge air) are formed. Such pipe intermediate spaces may, in particular, each be provided between adjacent pipes. The pipes can form one or more ducts in their interior. It is to be noted that within the meaning of this application the term "pipe block" refers to the unit of the pipes, in particular in their mounted arrangement. The term "pipe block" therefore does not exclude the pipe intermediate spaces referred to and is in particular not intended to indicate that the pipes have to be in contact with one another.

For example, it is also possible to provide that turbulence inlays are inserted into the pipe intermediate spaces. Said turbulence inlays may be in contact, for example, with the respectively adjacent pipes and/or be soldered to them, specifically in particular by means of solder plating.

The chamber may have an inlet opening for a coolant such as water or the like and an outlet opening for the coolant.

It is possible to provide that ribs are provided in the pipes, to be precise in particular in order to improve the conduction of heat.

There is particularly preferably provision that the heat exchanger is a charge air cooler or an exhaust gas cooler for an internal combustion engine of a motor vehicle. In this context it is possible to provide that the charge air or the exhaust gas can be cooled by means of a charge air cooler or exhaust gas cooler. It is possible to provide that the charge air or the exhaust gas enters one of the two boxes of the heat exchanger and subsequently flows through the pipes into the other of the two boxes. In this context, a coolant may flow through the pipe intermediate spaces or the chamber which is referred to.

In one advantageous configuration, the heat exchanger according to the invention is what is referred to as an all-aluminum heat exchanger, or is essentially completely composed of aluminum.

The pipes via which the first box is fluidically connected to the second box are preferably, in particular all, flat pipes. It is additionally preferred that the pipes or all the pipes via which the first box is fluidically connected to the second box run parallel with one another. The pipes via which the first box if fluidically connected to the second box are, in particular, arranged between the first box and the second box.

In a further advantageous embodiment, the heat exchanger has at least one cutout, in particular a plurality of cutouts. A force can particularly advantageously be applied to the pipes through the cutout, in particular during the joining process, in particular during the soldering process.

In order to manufacture a heat exchanger according to the invention, the ends of a plurality of pipes are firstly fed through the through-openings of the first base. The cover or, if the cover is composed of a plurality of parts, the parts of the cover are then arranged around the pipes, in which case they extend into the base groove of the first base.

The second base is then fitted onto the side lying opposite the first base so that the pipes are guided through the through-openings of the second base. The end regions of the pipes are then connected along their circumference to the bases by soldering. The cover or the parts of the cover are then connected to the bases in the region of the respective base cutout or in the region of the base groove by soldering. The boxes are then fitted onto one base each and secured by the respective second step of the respective base. The boxes are then connected to the respective base by welding.

According to the inventive manufacturing method, a heat exchanger as described above can be produced in a cost-effective way and/or with a very short manufacturing time. By virtue of the relatively large distance between the welding point and soldering point toward the outside compared to the prior art, the thermal loading on the soldering point is significantly reduced. This advantageously reduces the risk of a leak of the soldered connections and therefore improves the fabrication quality.

Further objects, features and advantages of the present invention will become apparent from the detailed description of preferred embodiments that follows, when considered together with the accompanying figures of drawing.

BRIEF DESCRIPTION OF THE DRAWINGS

In the text which follows, exemplary embodiments of the invention will now be explained in more detail with reference to the figures, in which.

DETAILED DESCRIPTION OF THE PREFERRED EMBODIMENTS

Figure 1:
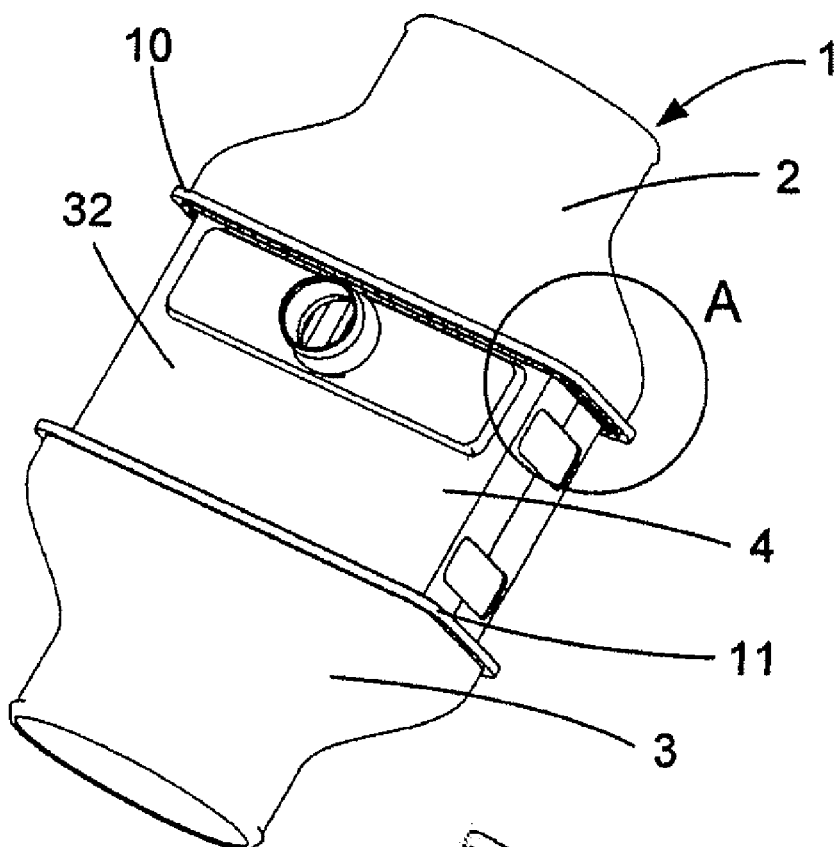
FIG. 1 is a perspective view of a heat exchanger according to an embodiment of the present invention.

FIG. 1 shows an embodiment of a heat exchanger 1 according to the invention. Said heat exchanger 1 comprises essentially a first box 2, a first base 10, a pipe block 4, a second base 11 and a second box 3. The pipe block 4 is surrounded by a cover 32. The heat exchanger has a longitudinal direction in which a charge air flow or an exhaust gas flow passes through it.

Figure 2:
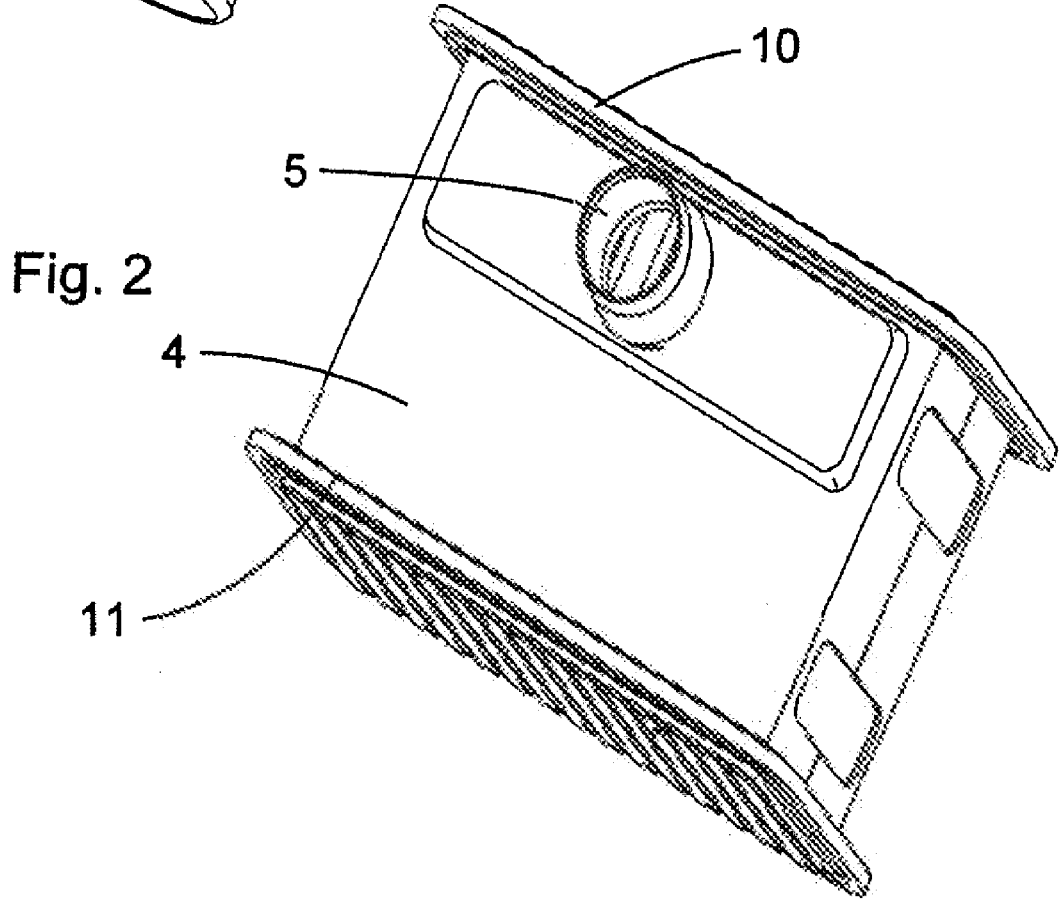
FIG. 2 is a perspective view of a pipe block with, in each case, a base at its end.

FIG. 2 shows an embodiment of the heat exchanger which is produced after the connection of the pipe block 4 to the two bases 10, 11. Arranged on one side of the pipe block 4 is a coolant connector 5 through which coolant can be fed to the pipe block 4 or carried away from it.

Figure 3:
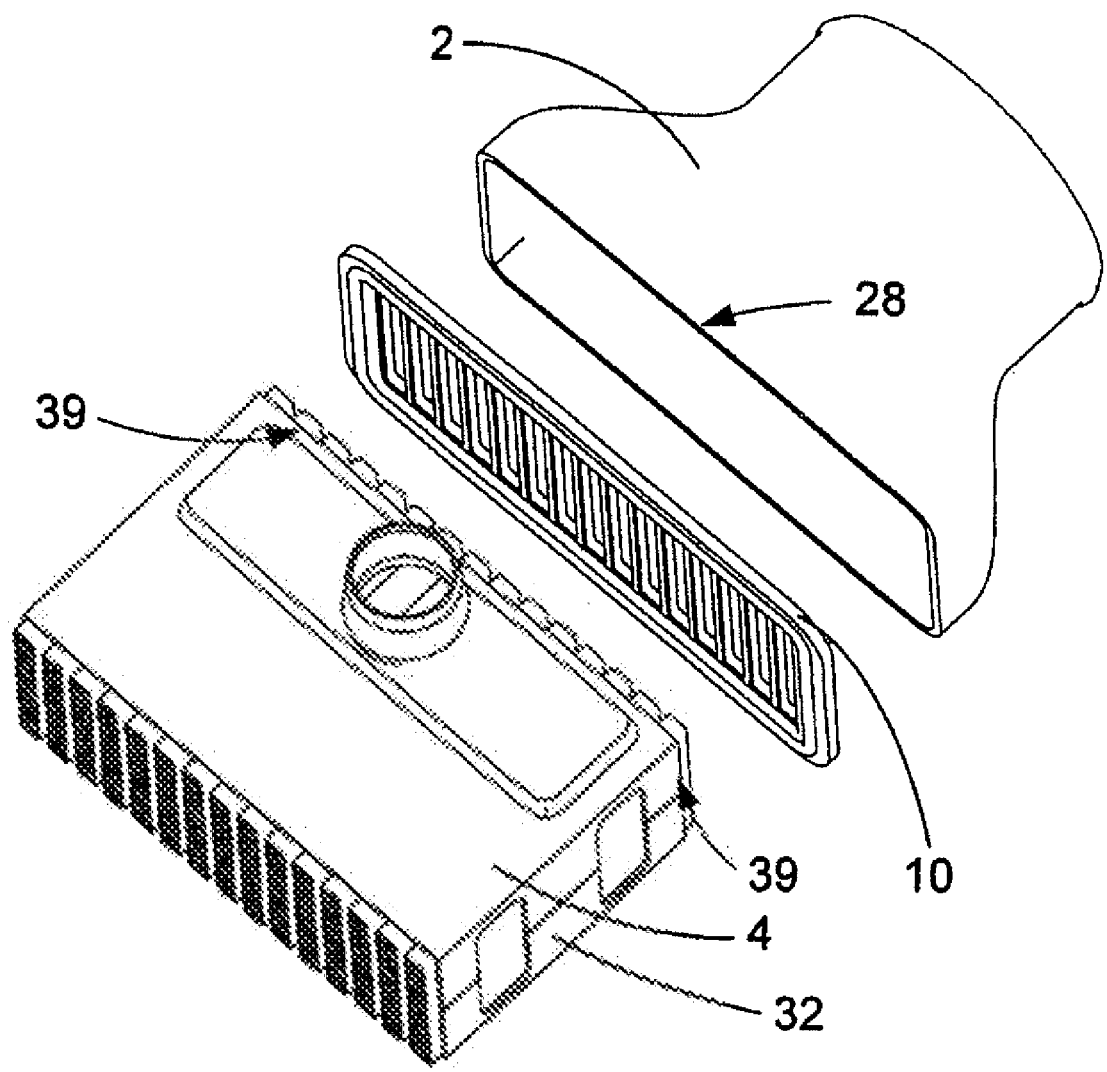
FIG. 3 is a perspective exploded view of selected components of a heat exchanger according to an embodiment of the present invention.

FIG. 3 is a perspective view of a heat exchanger according to the invention in which only selected components of the heat exchanger are illustrated. The pipe block 4 and the cover 32, the first base 10 and the first box 2 are illustrated. After the heat exchanger has been assembled, the first base 10 is connected both to the cover 32 and to the first box 2. The same applies to the connection of the second box 3 to the second base 11, which are not illustrated here. The boxes 2, 3 have an essentially hood-shaped design and an opening on each of their sides lying opposite one another. The opening cross-sections are configured in such a way that on the side of the box 2, 3 which is directed toward the base a receiving operation into the second step 21 of the base 10, 11 takes place, and on the side lying opposite this the boxes 2, 3 have an essentially circular cross section. The boxes 2, 3 are each one-piece components.

Figure 4:
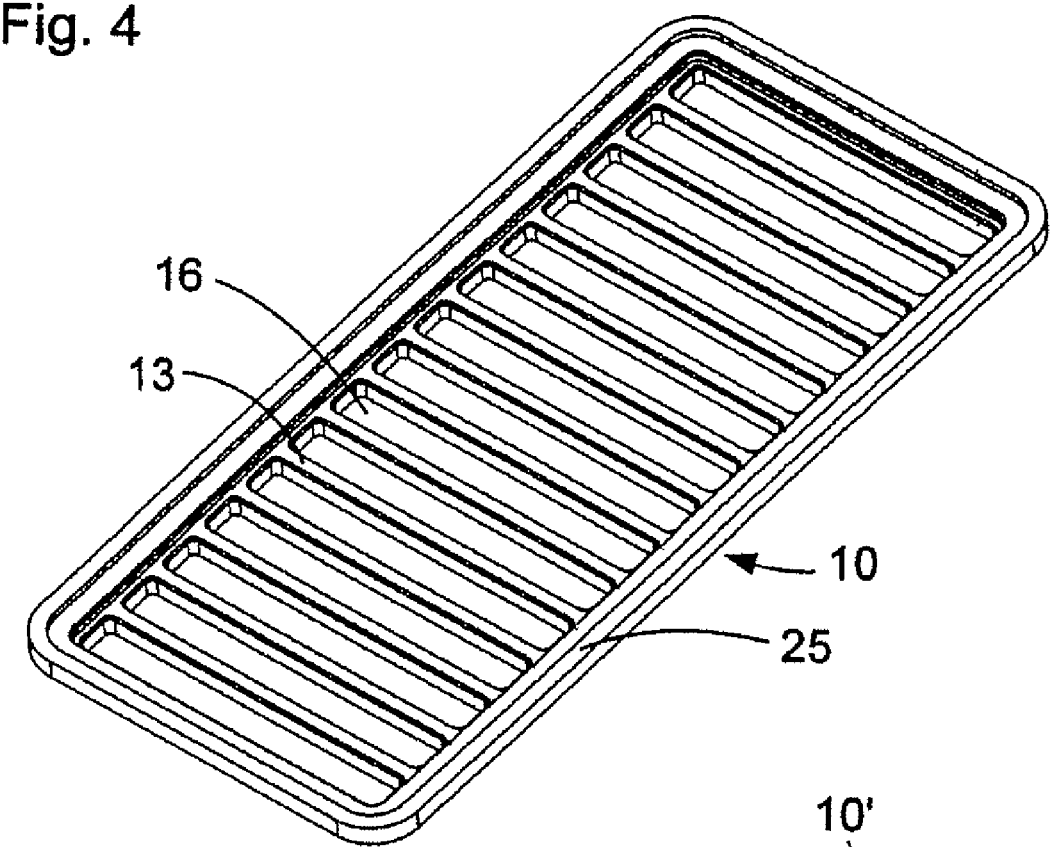
FIG. 4 is a perspective view of a first embodiment of the base according to the present invention.

FIG. 4 shows the rear view of a first embodiment of the base 10 according to the present invention. The base 10 has an essentially rectangular design in which the corner regions are each rounded. In the interior of the base 10, through-openings 16 are each arranged alternately transversely with respect to the longitudinal direction of the base 10, and web-like pipe spacing elements 13 are arranged, with the web-like pipe spacing elements 13 being spaced apart at regular intervals. The through-openings 16 receive the plurality of pipes of the pipe block (not illustrated). The through-openings 16 have an essentially rectangular shape, in which context the corners may be rounded. On one side of the base 10, the profiling elevation 25 which is embodied as a circumferential groove is formed in the edge region of the base 10.

Figure 5:
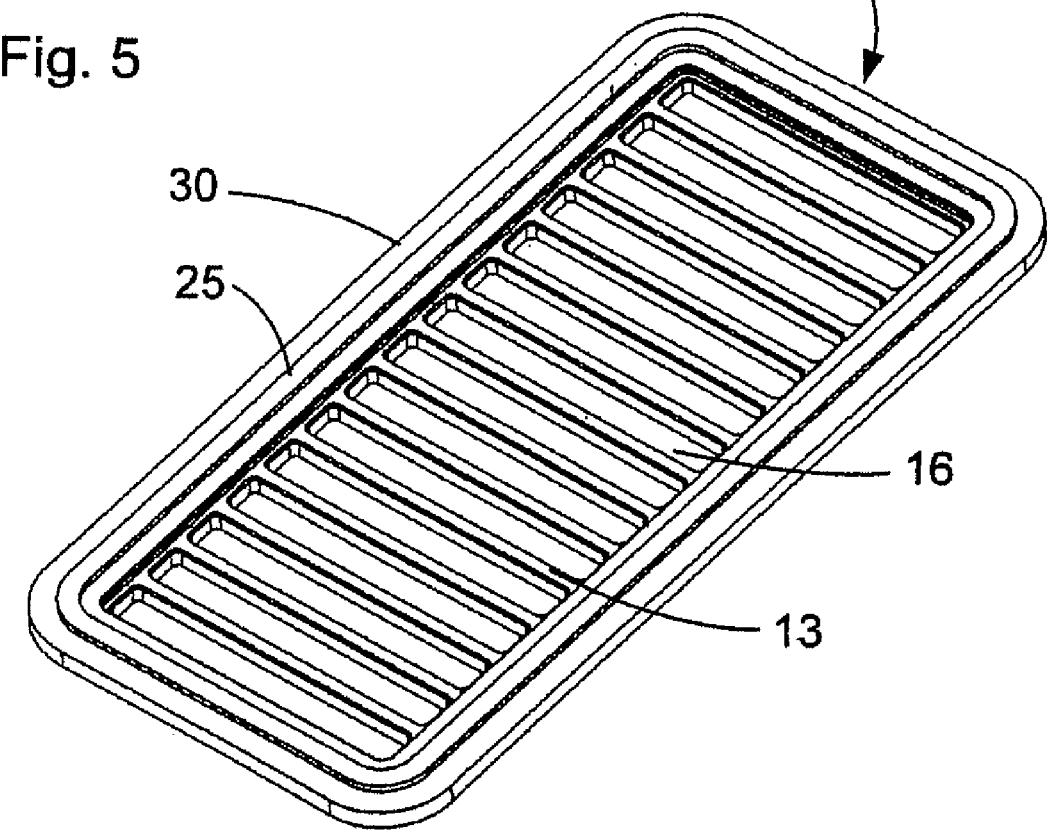
FIG. 5 is a perspective view of a second embodiment of the base according to the present invention.

FIG. 5 illustrates a second embodiment of the base 10' according to the present invention. Identical reference symbols refer to identical components and features. The second embodiment of the base 10' has, compared to the first embodiment of the base 10, an additional base protrusion 30 which permits, in particular when there is a small distance between the coolant connector 5 and the second step 21 in the longitudinal direction of the heat exchanger, the base 10' to be welded to the associated box 2, 3 and additionally significantly reduces the offset between the base 10' and box 2, 3 during welding.

Figure 6:
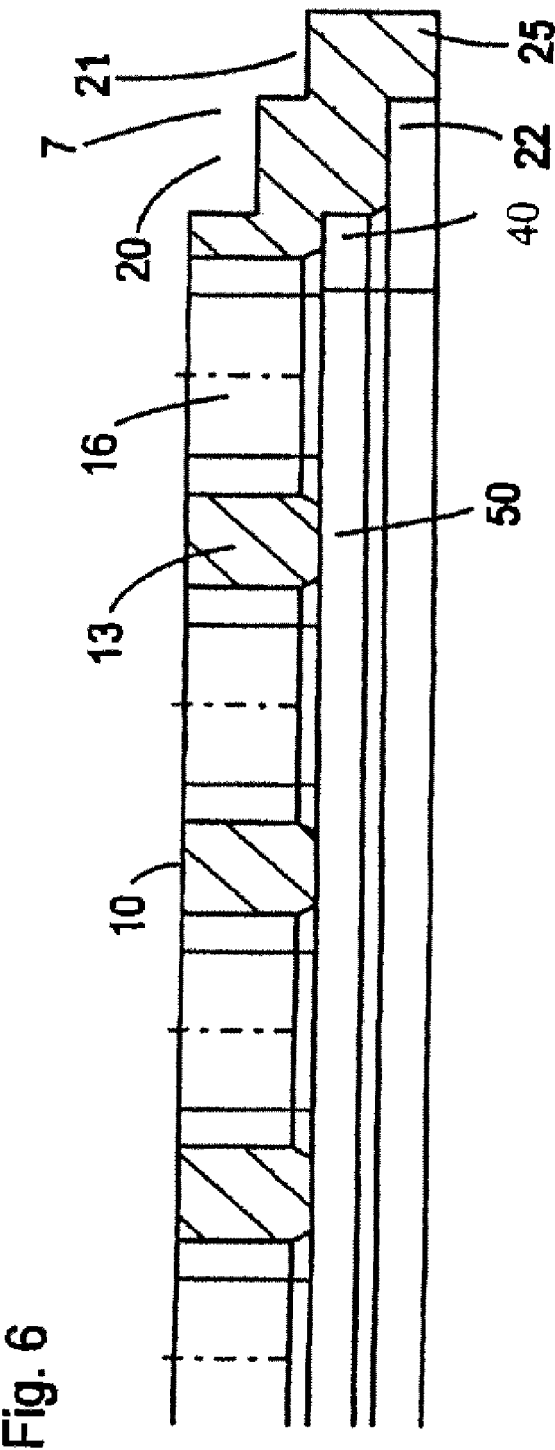
FIG. 6 is a sectional illustration of the first embodiment of the base according to the present invention.

FIG. 6 illustrates a section through the first embodiment of the base 10 for the edge region of the base 10. In the interior of the base 10, a plurality of through-openings 16 which alternate with web-like pipe spacing elements 13 are arranged. In the edge region of the base 10, a border 7, which comprises a first step 20 and a second step 21, is embodied, with the second step 21 being arranged in the region of the first step 20, offset toward the outside. The two steps 20, 21 each form, on the side facing the box, a surface which is essentially planar. On the side of the base 10 facing away from the box, a profiling elevation 25 which extends from the edge of the base 10 to the interior of the base 10 and essentially as far as the region of the second step 21 is embodied. Starting from the inside of the profiling elevation 25, a base cutout 22 is formed which extends into the interior of the base 10. In the region of the base cutout 22, a second cutout 50, which is offset toward the outside with respect to the base cutout 22 and forms, in its edge region, the base groove 26 for receiving the cover 32, extends on the side of the base 10 facing away from the box.

Figure 7:
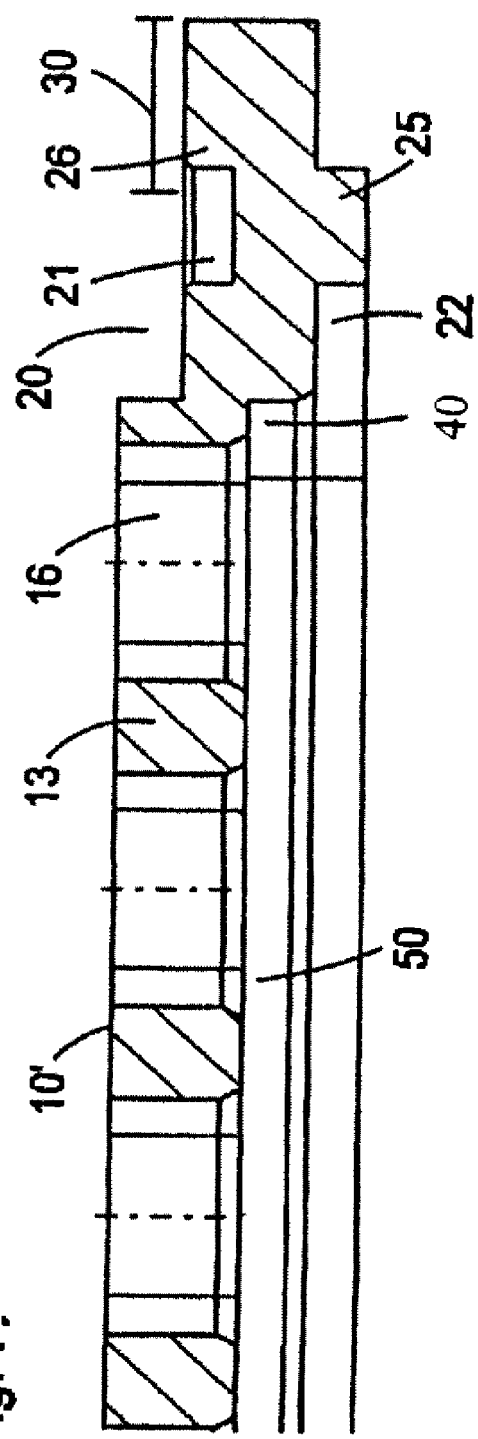
FIG. 7 is a sectional illustration of the second embodiment of the base according to the present invention.

FIG. 7 shows a section through the second embodiment of the base 10' for the edge region of the base 10'. In the text which follows, only the difference from the first embodiment of the base which is described above is explained. In the edge region of the base 10', a third step 26, which is offset toward the outside with respect to the second step 21, is embodied on the side of the base 10' facing the box, as a result of which a groove, into which the box extends, is embodied between the second step 21 and the third step 26. The upper edge of the second step 21 and the upper edge of the third step 26 are essentially arranged on a plane. The third step 26 forms, toward the outside, a base protrusion 30.

Figure 8:
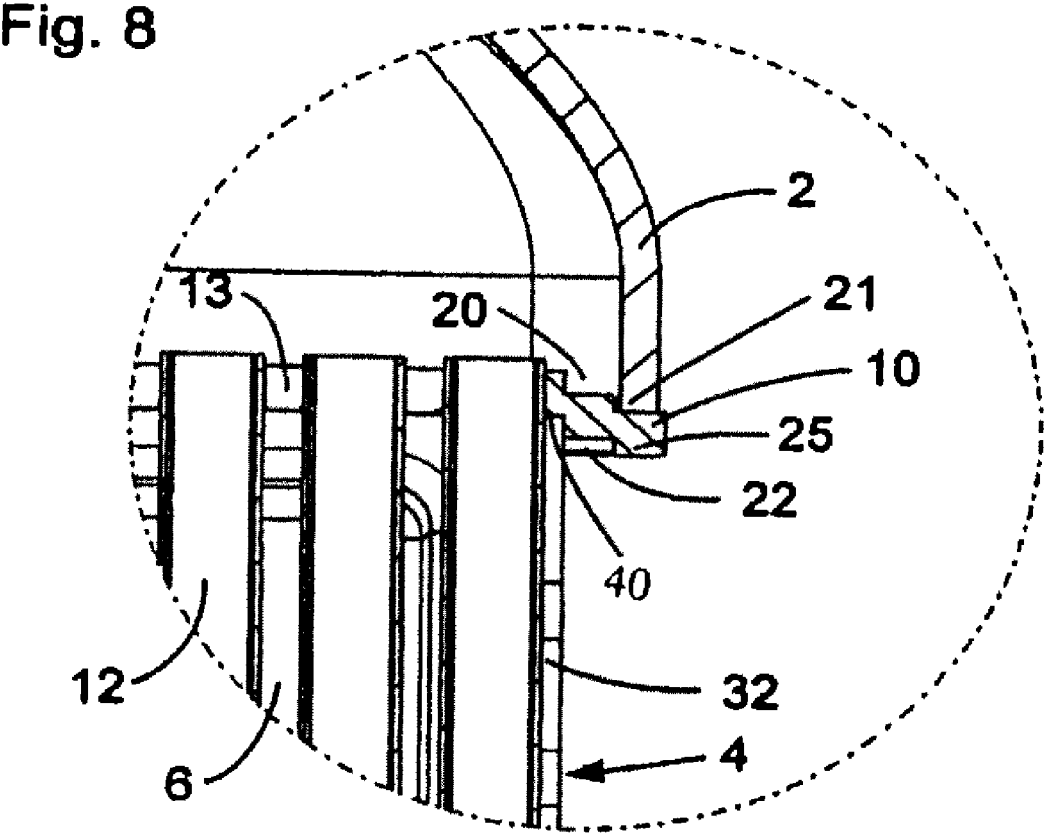
FIG. 8 is a sectional illustration of the region "A" according to FIG. 1 of the heat exchanger in accordance with an embodiment of the present invention with the first embodiment of the base.

FIG. 8 shows an enlarged sectional view of the region "A" according to FIG. 1 of a heat exchanger according to the invention with the first embodiment of the base 10. The base 10 connects the first box 2 and the pipe block 4. The first box 2 extends into the second step 21. A gap is embodied here between the inside of the first box 2 and the first step 20. A profiling elevation 25, which is a circumferential groove, is embodied on the side of the first base 10 facing away from the first box 2. A gap in the region of the base cutout 22 is embodied between the cover 32 and the profiling elevation 25. The plurality of pipes 10 in the chamber 6 are received by the through-openings in the first base 10 and in the second base 11 (not illustrated). The pipes 10 are separated from one another in the longitudinal direction of the base 10 by a web-like pipe spacing element 13. The pipe block 4 is bounded by the cover 32 with respect to the surroundings. The cover 32 extends in the first base 10 into the groove base 26, as a result of which said groove base 26 secures the cover 32 during the mounting of the pipe block 4 in the first base 10.

Figure 9:
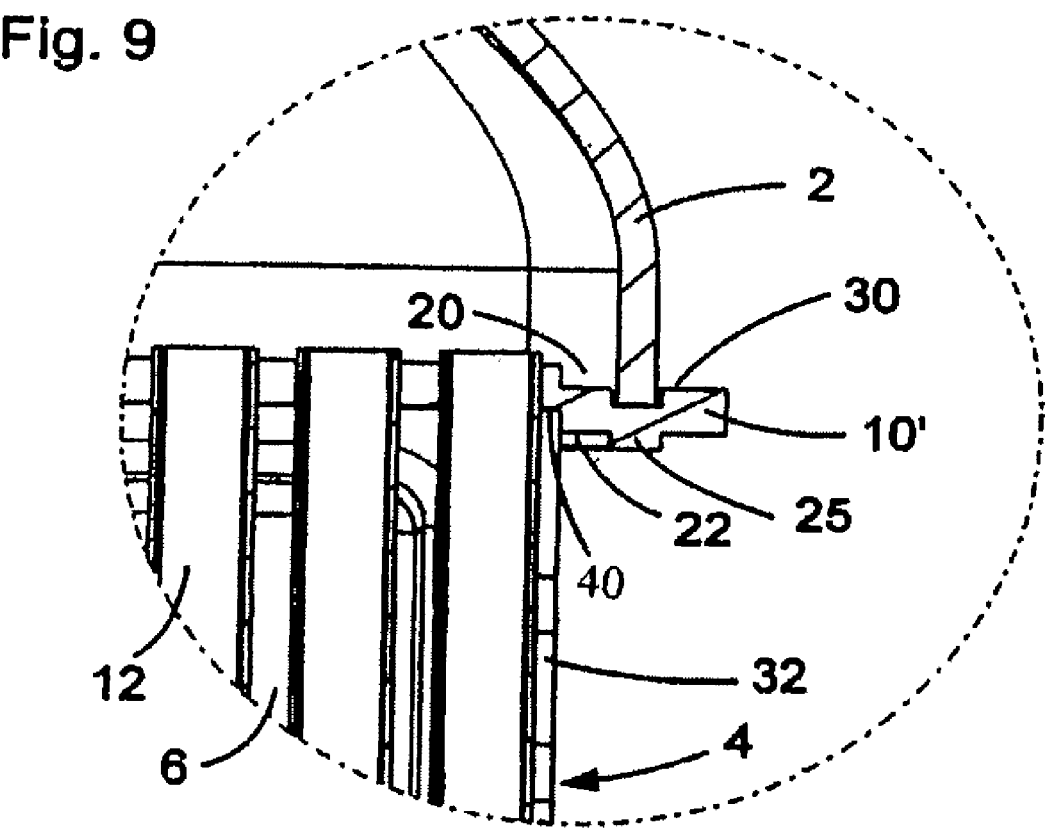
FIG. 9 is a sectional illustration of the region "A" according to FIG. 1 of the heat exchanger in accordance with an embodiment of the present invention with the second embodiment of the base.

FIG. 9 shows a heat exchanger according to the invention in accordance with FIG. 8 which differs from the heat exchanger according to the invention in FIG. 8 only in the second embodiment of the base 10'. In the text which follows, details are therefore given only on the difference with respect to FIG. 8. The second base 10' has, in the edge region, a base protrusion 30 which is approximately 5 mm. In the region of the step 20 a groove, into which the first box 2 extends, is embodied between the second step and the third step. This groove is essentially a circumferential groove. The upper edge of the second step and the upper edge of the third step lie essentially in one plane.

The foregoing description of preferred embodiments of the invention has been presented for purposes of illustration and description only. It is not intended to be exhaustive or to limit the invention to the precise form disclosed, and modifications and variations are possible and/or would be apparent in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto and that the claims encompass all embodiments of the invention, including the disclosed embodiments and their equivalents.

What is claimed is:

1. A heat exchanger for an internal combustion engine of a motor vehicle, comprising:
a first box,
a second box arranged spaced apart from the first box,
a plurality of pipes by which the first box and the second box are fluidically connected,
a chamber through which a coolant can flow and which is arranged between the first and second boxes and through which two or more of the plurality of pipes run, and
a base comprising one or more through-openings for receiving the pipes and a border comprising a groove base, a first step, and a second step,
wherein the border is arranged essentially in an edge region of the base and the groove base, the first step, and the second step are continuous around the periphery of the base;
wherein the first step of the border lies adjacent to the groove base, is radially farther from a center of the base than the groove base, and recedes in a first direction from the groove base such that an upper surface of the first step is positioned below an upper surface of the groove base, and the second step of the border lies adjacent to the first step, is radially farther from the center of the base than the first step, and recedes in the first direction from the first step; and
wherein the first direction is towards a center of the heat exchanger.

2. A method for manufacturing a heat exchanger according to claim 1 comprising the steps: mounting a pipe block; connecting the pipes to the base by soldering; connecting a cover to the base in a region of a base cutout by soldering; and connecting of at least one of the first and second boxes to the base by welding.

3. The heat exchanger according to claim 1, wherein the border of the base has a third step with an upper edge, wherein the upper edge lies in a plane with the first step.

4. The heat exchanger according to claim 3, wherein an upper edge of the second step is a bottom of a groove between the first step and the third step.

5. The heat exchanger according to claim 4, wherein the second step is a circumferential or essentially circumferential groove.

6. The heat exchanger according to claim 1, wherein at least one of the first and second boxes or a wall section of the one of the first and second boxes extends into the second step of the border of the base.

7. The heat exchanger according to claim 6, wherein the base includes a profiling elevation on a side of the base facing away from the one of the first and second boxes.

8. The heat exchanger according to claim 7, wherein, on the side of the base facing the first direction, a base cutout extends from the profiling elevation of the base towards the center of the base.

9. The heat exchanger according to claim 8, wherein the chamber comprises a cover for bounding the chamber, and wherein a wall section of the cover extends into the groove base of the border.

10. The heat exchanger according to claim 9, wherein the base cutout forms a gap between the cover and the profiling elevation.

11. The heat exchanger according to claim 1, wherein the base further comprises a base protrusion radially farther from the center of the base than the second step.

12. The heat exchanger according to claim 11, wherein the base protrusion is between 3 mm and 10 mm.

13. The heat exchanger according to claim 1, wherein at least one of the first and second boxes is manufactured using a casting method.

14. A heat exchanger for an internal combustion engine of a motor vehicle, comprising:
   a first box,
   a second box arranged spaced apart from the first box,
   a plurality of pipes by which the first box and the second box are fluidically connected,
   a chamber through which a coolant can flow and which is arranged between the first and second boxes and through which two or more of the plurality of pipes run, and
   a base comprising one or more through-openings for receiving the pipes and a border comprising a groove base, a first step, and a second step,
   wherein the base further comprises an end wall that connects an upper surface and a lower surface of the second step, but does not extend past the upper and lower surfaces, to form an outer boundary of the base,
   wherein the border is arranged essentially in an edge region of the base and the groove base, the first step, and the second step are continuous around a periphery of the base,
   wherein the first step of the border lies adjacent to the groove base, is radially farther from a center of the base than the groove base, and recedes in a first direction from the groove base,
   wherein the second step of the border lies adjacent to the first step, is radially farther from the center of the base than the first step, and recedes in the first direction from the first step; and
   wherein the first direction is towards a center of the heat exchanger.

15. The heat exchanger according to claim 1,
   wherein at least one of the first and second boxes or a wall section of the one of the first and second boxes extends into the second step of the border of the base,
   wherein the chamber comprises a cover for bounding the chamber, and
   wherein a wall section of the cover extends into the groove base of the border.

* * * * *